(12) United States Patent
Badleirostami et al.

(10) Patent No.: US 8,203,716 B2
(45) Date of Patent: Jun. 19, 2012

(54) TANDEM FABRY-PEROT ETALON CYLINDRICAL BEAM VOLUME HOLOGRAM FOR HIGH RESOLUTION/LARGE SPECTRAL RANGE DIFFUSE LIGHT SPECTROSCOPY

(75) Inventors: Majid Badleirostami, Atlanta, GA (US); Omid Momtahan, Foothill Ranch, CA (US); Chao Ray Hsieh, Atlanta, GA (US); Ali Adibi, Suwanee, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 478 days.

(21) Appl. No.: 12/447,992

(22) PCT Filed: Aug. 3, 2007

(86) PCT No.: PCT/US2007/075145
§ 371 (c)(1),
(2), (4) Date: Apr. 30, 2009

(87) PCT Pub. No.: WO2008/054908
PCT Pub. Date: May 8, 2008

(65) Prior Publication Data
US 2010/0110442 A1    May 6, 2010

Related U.S. Application Data

(60) Provisional application No. 60/855,836, filed on Oct. 30, 2006.

(51) Int. Cl.
*G01J 3/45* (2006.01)
(52) U.S. Cl. ........................................................ 356/454
(58) Field of Classification Search .................. 356/451, 356/454, 456, 457, 458
See application file for complete search history.

(56) References Cited

U.S. PATENT DOCUMENTS

| | | | | |
|---|---|---|---|---|
| 3,603,685 | A | * | 9/1971 | Heflinger et al. ............. 356/458 |
| 3,970,390 | A | * | 7/1976 | Heflinger et al. ............. 356/458 |
| 5,235,440 | A | * | 8/1993 | Clark et al. ...................... 359/11 |
| 5,638,173 | A | | 6/1997 | Smith et al. |
| 5,686,988 | A | * | 11/1997 | Garrett .......................... 356/318 |
| 5,817,462 | A | * | 10/1998 | Garini et al. ...................... 506/9 |
| 5,978,112 | A | | 11/1999 | Psaltis et al. |
| 6,055,325 | A | * | 4/2000 | Garini et al. .................. 382/129 |
| 6,486,948 | B1 | * | 11/2002 | Zeng ............................. 356/301 |
| 7,092,101 | B2 | * | 8/2006 | Brady et al. .................. 356/456 |

(Continued)

OTHER PUBLICATIONS

D.J. Brady, Multiplex Sensors and the Constant Radiance Theorem, Optics Letters 27, 16-18 (2002).

(Continued)

*Primary Examiner* — Tarifur Chowdhury
*Assistant Examiner* — Jonathan Hansen
(74) *Attorney, Agent, or Firm* — Thomas, Kayden, Horstemeyer & Risley LLP.

(57) ABSTRACT

Systems and methods for performing two-dimensional (2D) high resolution spectral-spatial mapping are described. At least one embodiment includes a spectrometer for performing two-dimensional (2D) high resolution spectral-spatial mapping comprising a Fabry-Perot component configured to receive a diffuse input beam and provide a high resolution spectral mapping of the diffuse input beam in a first direction. The spectrometer further comprises a volume hologram for increasing a spectral operating range, the volume hologram configured to perform spectral mapping in a second direction orthogonal to the first direction to increase the spectral operating range. The spectrometer further comprises a charged coupled device (CCD) configured to receive output beams, the output beams used to provide spectral analysis of the input beams.

26 Claims, 16 Drawing Sheets

U.S. PATENT DOCUMENTS

| | | | |
|---|---|---|---|
| 7,158,228 B2* | 1/2007 | Psaltis et al. | 356/326 |
| 7,262,889 B2* | 8/2007 | Sun et al. | 359/15 |
| 7,515,319 B2 | 4/2009 | Adibi et al. | |
| 7,660,039 B2* | 2/2010 | Santoro et al. | 359/599 |
| 7,826,062 B2* | 11/2010 | Weitzel | 356/498 |
| 2005/0264808 A1* | 12/2005 | Wang | 356/328 |
| 2006/0103904 A1 | 5/2006 | Adibi et al. | |
| 2010/0201979 A1* | 8/2010 | Momtahan et al. | 356/319 |

OTHER PUBLICATIONS

J.T. Verdeyen, Laser Electronics, 3rd ed., Englewood Cliffs, NJ: Prentice Hall, 1995. Chapter 3,pp. 63-73.

P.C. Clemmow, The Plane Wave Spectrum Representation of Electromagnetic Fields, Oxford University Press-IEEE Press, New York, 1996, Chapter 2, pp. 11-37.

George Barbastathis, Michael Levene, and Demetri Psaltis, "Shift Multiplex with Spherical Reference Wave", Appl. Op. 35, (1996) pp. 2403-2417.

Shepherd, G., C. Lake, et al. (1965). "A Spatial Spectral Scanning Technique for Fabry-Perot Spectrometer." Applied Optics 4(3): 267-272.

Conde, M. (2002). "Deriving wavelength spectra from fringe images from a fixed-gaps Single-Etalon Fabry-Perot Spectrometer." Applied Optics 41(14): 2672-2678.

Xu, Z. C., Z. L. Wang, et al. (2003). "Multimodal Multiplex Spectroscopy Using Photonic Crystals." Optics Express 11 (18): 2126-2133.

International Search Opinion and Written Opinion of the International Searching Authority for PCT/US2007/075145 mailed Apr. 2, 2008.

B. Bates, D. J. McCartney, C. D. McKeith, A. McQuoid, and O. E. Sproule, "Interferometer-grating Spectrograph for High Resolution Astronomical Spectroscopy in the Middle uv," Applied Optics 14, 2119-2124 (1978).

C. Hsieh, O. Momtahan, A. Karbaschi, and A. Adibi, "A Compact Fourier Transform Volume Holographic Spectrometer for Diffuse Source Spectroscopy," Opt. Lett. 30, 836-838 (2005).

E.D. Nelson and M.L. Fredman, "Hadamard Spectroscopy," J. Opt. Soc. Am. 60, 1664-1669 (1970).

O. Momtahan, C. Hsieh, A. Karbaschi, A. Adibi, M.E. Sullivan, and D.J. Brady, "Spherical Beam Volume Holograms for Spectroscopic Applications: Modeling and Implementation," Appl. Opt. 43, 6557-6567 (2004).

* cited by examiner

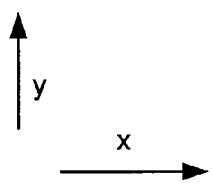
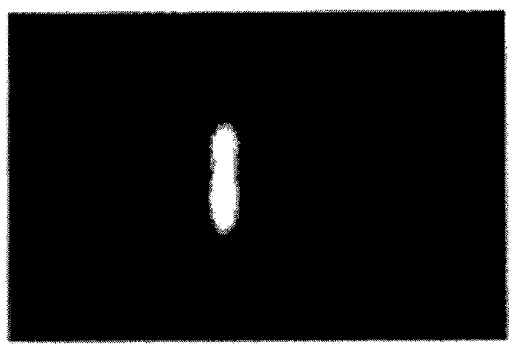
FIG. 4A
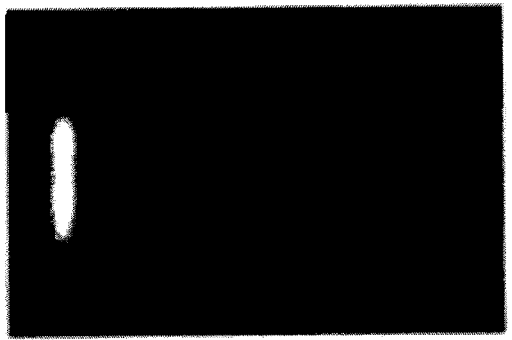
FIG. 4B
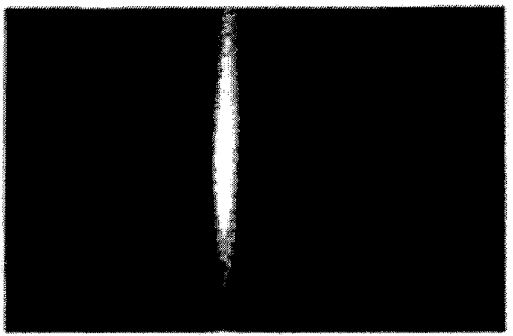
FIG. 4C
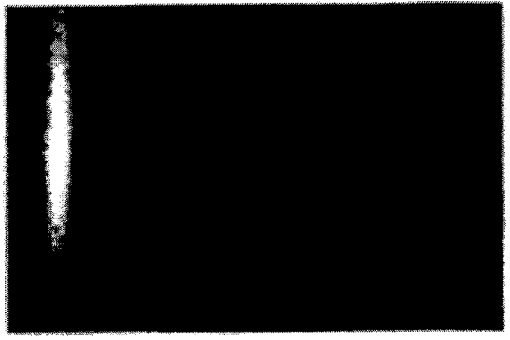
FIG. 4D

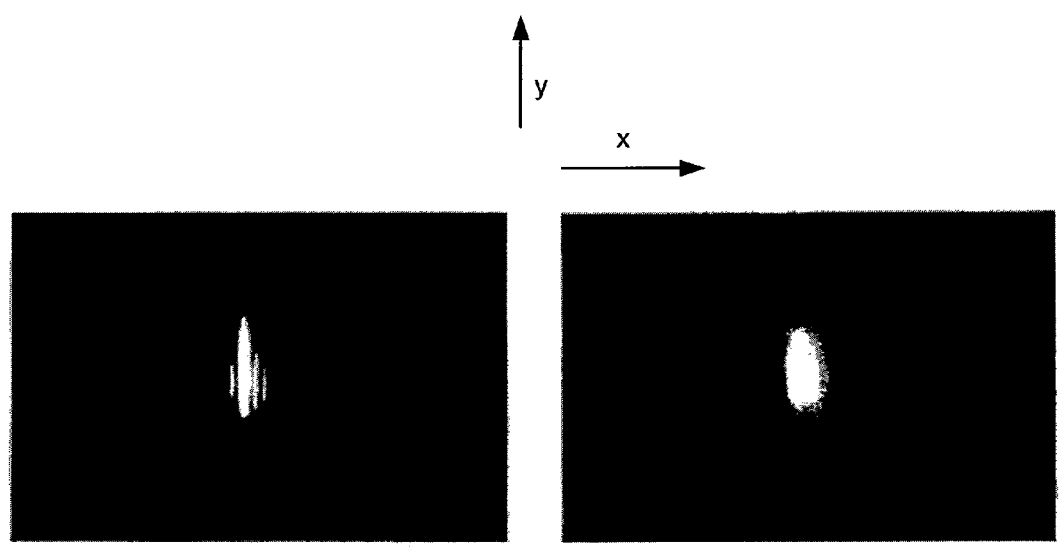
FIG. 5A          FIG. 5B

TANDEM FABRY-PEROT ETALON CYLINDRICAL BEAM VOLUME HOLOGRAM FOR HIGH RESOLUTION/LARGE SPECTRAL RANGE DIFFUSE LIGHT SPECTROSCOPY

CROSS-REFERENCE TO RELATED APPLICATION

This application claims priority to, and the benefit of, U.S. Provisional Patent Application entitled, "TANDEM FABRY-PEROT ETALON CYLINDRICAL BEAM VOLUME HOLOGRAM FOR HIGH RESOLUTION LARGE SPECTRAL RANGE DIFFUSE LIGHT SPECTROSCOPY," having Ser. No. 60/855,836, filed on Oct. 30, 2006, which is incorporated by reference in its entirety. This application also claims priority to, and the benefit of, PCT Application No. PCT/US2007/075145 entitled, "TANDEM FABRY-PEROT ETALON CYLINDRICAL BEAM VOLUME HOLOGRAM FOR HIGH RESOLUTION LARGE SPECTRAL RANGE DIFFUSE LIGHT SPECTROSCOPY," filed on Aug. 3, 2007, which is entirely incorporated herein by reference.

STATEMENT REGARDING FEDERALLY SPONSORED RESEARCH OR DEVELOPMENT

This invention was made with Government support under Agreement Number N01AA23013, awarded by the National Institutes of Health. The Government has certain rights in the invention.

TECHNICAL FIELD

The present disclosure generally relates to the field of spectroscopy and more particularly, relates to utilizing a Fabry-Perot etalon in tandem with a cylindrical beam volume holograms to perform diffuse light spectroscopy.

BACKGROUND

The basic principle behind most spectrometers involves the separation of different wavelength channels within an input beam onto different locations of an output plane using some type of dispersive element. The output may be detected using some type of detector array or a charged coupled device (CCD). Because of the scalar nature of the spectrum, such dispersive elements (e.g., gratings and prisms) generally provide a mapping between the different wavelengths and various spatial locations along a line on the detector. For example, for the case of a simple sinusoidal grating, dispersion is obtained across a line in a direction parallel to the grating vector. Thus, in the direction perpendicular to the grating vector, the output beam is almost uniform and does not carry any spectral information. Generally for most applications, a CCD, which is a two-dimensional array of detectors, will be used in the output plane. However, the output in the direction perpendicular to the dispersion direction is almost useless in most conventional implementations.

There are several parameters involved in the design of an efficient spectrometer. Two important performance attributes of a spectrometer are the resolution and spectral operating range of the spectrometer. The resolution of a spectrometer is generally defined as the smallest difference in the wavelengths of two monochromatic input beams that can be resolved at the corresponding outputs at a detector. The operating range of the spectrometer is defined as the maximum range of wavelengths over which the spectrometer can determine the spectrum of the input. While both the resolution and the operating range of any spectrometer depend on several design parameters, it is difficult to maximize both parameters using conventional design techniques.

SUMMARY

Systems and methods for performing two-dimensional (2D) high resolution spectral-spatial mapping are described. Briefly described, one embodiment, among others, includes a spectrometer for performing two-dimensional (2D) high resolution spectral-spatial mapping comprising a Fabry-Perot component configured to receive a diffuse input beam and provide a high resolution spectral mapping of the diffuse input beam in a first direction. The spectrometer further comprises a volume hologram for increasing a spectral operating range, the volume hologram configured to perform spectral mapping in a second direction orthogonal to the first direction to increase the spectral operating range. The spectrometer further comprises a charged coupled device (CCD) configured to receive output beams, the output beams used to provide spectral analysis of the input beams.

Another embodiment includes a spectrometer for performing two-dimensional (2D) high resolution spectral-spatial mapping comprising a volume hologram for increasing a spectral operating range, the volume hologram configured to perform spectral mapping in a second direction orthogonal to a first direction to increase a spectral operating range. For some embodiments, the CBVH comprises an integrated Fabry-Perot component configured to receive a diffuse input beam and provide a high resolution spectral mapping of the diffuse input beam in the first direction in addition to two cylindrical lenses. The spectrometer further comprises a charged coupled device (CCD) configured to receive the outputs beams, the output beams used to provide spectral analysis of the input beams.

Another embodiment includes a method for performing two-dimensional (2D) high resolution spectral-spatial spectroscopy comprising receiving input beams at a Fabry-Perot component configured to provide a high resolution spectral-spatial mapping of the input beam in a first direction, increasing a spectral operating range for spectral-spatial mapping using a volume hologram, the volume hologram configured to perform spectral mapping in a second direction orthogonal to the first direction to increase a spectral operating range and receiving an output pattern at a charged coupled device (CCD) configured to provide spectral analysis of the input beams.

Yet another embodiment includes an apparatus for performing two-dimensional (2D) high resolution spectral-spatial mapping comprising means for receiving a diffuse input beam and providing a high resolution spectral mapping of the diffuse input beam in a first direction, means for increasing a spectral operating range by performing spectral mapping in a second direction orthogonal to the first direction, means for receiving beams at a first cylindrical lens and focusing the received beams in the first direction, means for focusing the beams in the second direction to generate an output pattern, and means for receiving the output pattern, the output pattern used to provide spectral analysis of the input beams.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIGS. 4A-4D illustrate various outputs detected by a charge coupled device in the exemplary spectrometer from FIG. 3.

FIGS. 5A-5B illustrate various outputs detected by a charge coupled device in the exemplary spectrometer from FIG. 3 where a lens with higher focusing power compared to the one used in FIGS. 4A-4D is utilized.

DETAILED DESCRIPTION

Figure 1:
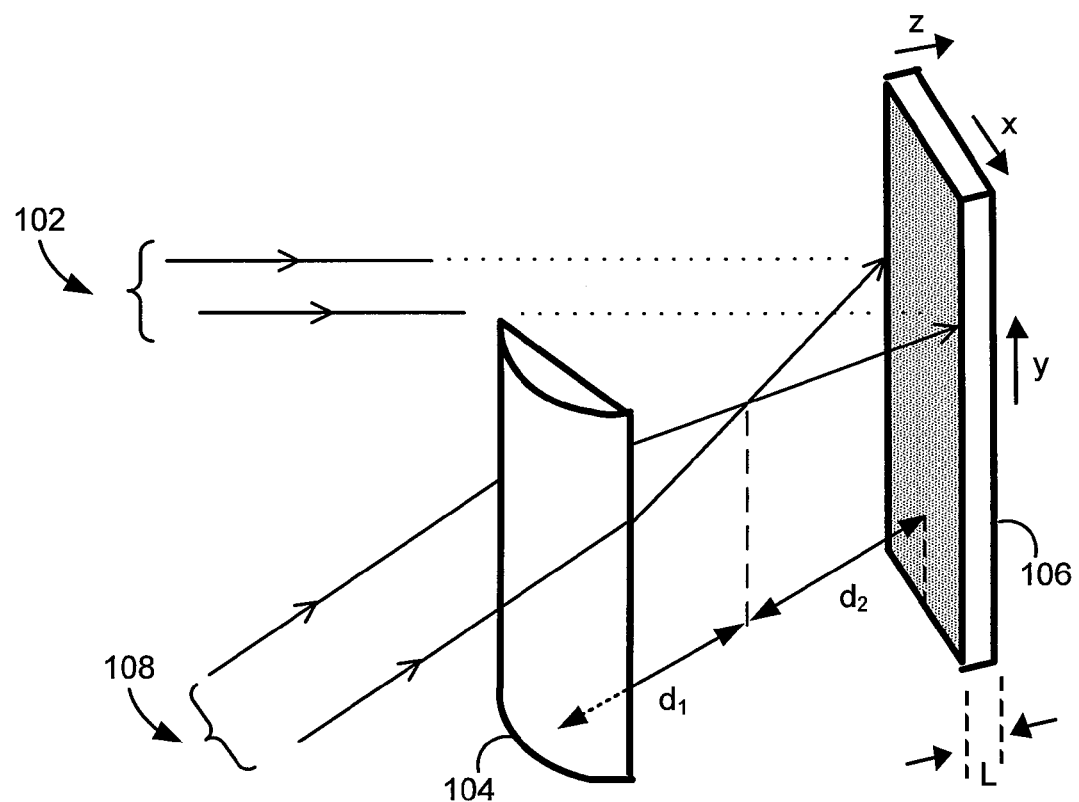
FIG. 1 is a diagram of an exemplary setup for recording a cylindrical beam volume hologram.

Embodiments described herein include systems and methods for expanding the spectral-spatial mapping into one or two dimensions and for performing coded spectroscopy. Embodiments of cylindrical beam volume holograms (CBVHs) provide spectral diversity in one direction without affecting the beam in the other direction. In addition, various embodiments of a spectrometer system utilizing a CBVH can be realized due to the independent treatment of the input beam in different directions. As a non-limiting example, in the direction parallel to the axis of the cylindrical beam in the recording configuration, different segments of the hologram can be recorded with different recording conditions (e.g., different plane waves) in order to provide two-dimensional spectral-spatial mapping at the output. This results in an increase in the range of the operating wavelength and/or the resolution of the system. Thus, embodiments of CBVHs provide for spatial mapping in two dimensions rather than in just one dimension, as provided by most conventional approaches to spectroscopy. Furthermore, it should be emphasized that the CBVH replaces the functionality of the input slit, the input collimating element, and the grating found in conventional spectrometers. Thus, embodiments of CBVHs provide spectrometers that have a fewer number of elements, thereby resulting in more compact, relatively low cost, and robust spectrometers. Other embodiments of the spectrometer system described herein incorporate angular multiplexing where multiple holograms are multiplexed into each segment of the CBVH and different segments are spatially multiplexed into the CBVH in order to provide a coded mapping of the input spectrum onto a two-dimensional output. Simple post processing may then be performed in order to derive the spectrum of the input beam from the coded output with a high degree of accuracy.

Generally, to determine the spectral characteristics of an arbitrary beam, a mapping is performed of the scalar quantity of the spectrum i.e., light intensity vs. different wavelengths) associated with the beam onto different spatial locations in an output plane. Typically, the spectrum of the input beam is spatially mapped onto a line in the output plane. This mapping can be efficiently implemented by modifying the beam only in one direction while the beam remains intact in the other direction.

As briefly described above, a key component in spectrometers is the wavelength sensitive (or dispersive) component that provides separation of different wavelength channels for detection purposes. Thin holograms (or gratings) are well-known candidates for achieving this because of their wavelength selectivity, which results in non-uniform diffraction of different wavelength channels of a collimated optical beam. Most of the optical spectrometers built based on this phenomenon exploit surface relief or thin film gratings, which primarily have single grating vectors. Exemplary embodiments of CBVHs described herein comprise thick volume holograms recorded using one or more plane waves and a cylindrical beam formed by a cylindrical lens. Because of the Bragg selectivity of the volume holograms, the separation of different wavelength channels is obtained for either a collimated beam or a diffuse beam. It should be appreciated that because of this unique property, the CBVH replaces various elements found in conventional spectrometers, including the input slit, the collimating lens or, mirror, and the thin hologram or grating. In this respect, exemplary embodiments of the CBVH provide for compact and robust slitless spectrometers.

For embodiments of the spectrometer systems described herein, the spectral properties of the input beam are detected in a specific direction in the output plane while the orthogonal direction can be used to independently modify the beam through the system. It should be emphasized that embodiments of the spectrometer provide independent functionality in two orthogonal directions. As a result, unique applications can be realized by using embodiments of the CBVHs described herein. As a non-limiting example of one application, spectral-spatial mapping can be performed in two dimensions with a charged coupled device (CCD) placed at the output by recording different CBVHs into different segments of the hologram. Furthermore, multiple CBVHs may be multiplexed within each segment through angular multiplexing. As a result, coding can be performed on the mapping from the spectrum of the input beam into the various segments at the output.

In accordance with certain aspects of CBVHs described herein, FIG. 1 is a block diagram of an exemplary setup for recording a CBVH. Shown in FIG. 1 is a hologram (i.e., CBVH) 106 recorded using a plane wave 102 and a beam 108 focused by a cylindrical lens 104. For alternative embodiments, the hologram 106 may be recorded using two cylindrical beams formed by two cylindrical lenses. As illustrated in FIG. 1, the focus point of the cylindrical beam occurs at a distance $d_1$ behind the lens 104 and at a distance $d_2$ in front of the hologram 106. Furthermore, as depicted in FIG. 1, the hologram 106 has a thickness L. Depending on the application, the exemplary setup shown in FIG. 1 may be modified by adjusting the incident angles of the plane wave 102 and the cylindrical beam 108. It should be noted that beyond the cylindrical lens 104, the beam 108 is focused in the x-direction while it remains unmodified in the y-direction. The interference pattern between the cylindrical beam and the plane wave is recorded onto the hologram 106.

The properties of the CBVH can be explained from the plane wave expansion of the cylindrical beam. The electric field in the y-direction corresponding to a cylindrical beam 108 with the axis parallel to the y-axis, originated from a line source at $r_0=(0,y,-d)$ and monitored at $r=(x,y,z)$, is represented by a Hankel function of the zeroth order and of the first kind $H_0^{(1)}$. The field may be expressed by its Fourier transform as follows:

$$H_0^{(1)}(k|r-r_0|) = \frac{1}{\pi}\int \frac{1}{k_z} e^{jk_z(z+d)} e^{jk_x x} dk_x \quad (1)$$

In the equation above, $k_x$ and $k_z$ are the x- and z-components of the wave vector k. The amplitude of the wave vector k is the wave number $k=2\pi/\lambda$, where $\lambda$ is the wavelength. It should be noted that in the equation above, the $k_y$ component is 0 and therefore, the following holds true: $k_x^2+k_z^2=k^2$. Furthermore, it should be noted that the relation in the equation above is valid for all values of y. The hologram that is recorded by the cylindrical beam and a plane wave can be represented as the superposition of several simple gratings formed by the interference of each plane wave component of the cylindrical beam with the recording plane wave. Therefore, the diffraction from the CBVH can be found by superposing the diffracted components from the simple gratings. From Equation (1), it is clear that the cylindrical beam has no plane wave propagating in the y-direction. Therefore, no grating is formed in the y-direction and the recorded CBVH does not affect the reading beam in the y-direction.

Figure 2:
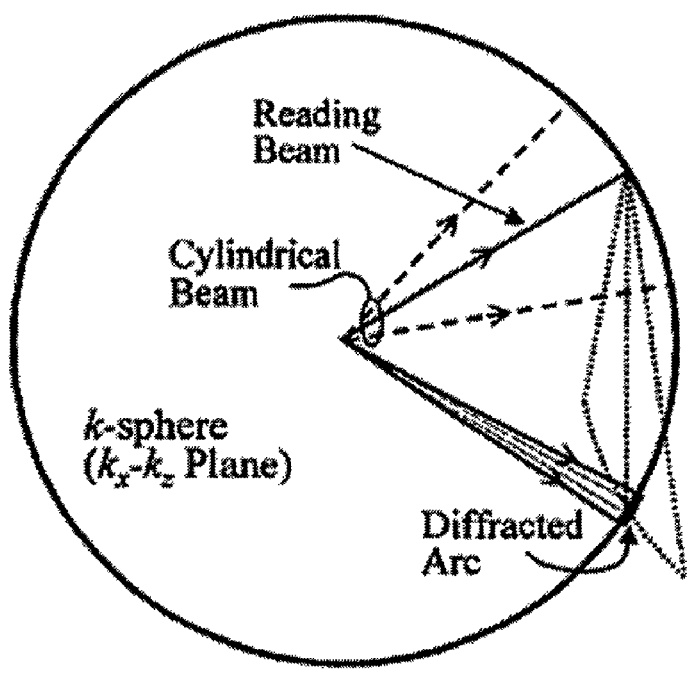
FIG. 2 depicts a k-sphere holographic representation of the cylindrical beam volume hologram from FIG. 1.

Reference is now made to FIG. 2, which depicts a k-sphere holographic representation of the CBVH from FIG. 1. The k-domain representation of the CBVH is depicted as a circle in the x-z plane and further illustrates some of the novel characteristics of the CBVH disclosed herein. The diverging beam coming from the cylindrical lens is represented by a sector. As neither the cylindrical beam nor the plane wave carry any propagation component in the y-direction, the two-dimensional k-domain representation shown in FIG. 2 is used for recording the CBVH. When the hologram is read by a plane wave mainly propagating in the direction of the cylindrical beam, a small set of k-vectors will be Bragg-matched to form the diffracted beam. If the angle of the reading beam is changed (within the angular extent of the recording cylindrical beam), another set of k-vectors will be Bragg-matched, but the direction of the diffracted beam will be unchanged. It should be noted that this is the main property of the CBVH which allows diffraction of a collimated or a diffuse input beam into a beam with very small spatial frequency (close to a plane wave). The CBVH exhibits this property even if the wavelength of the reading beam is different from the recording wavelength. In this respect, the spectrometer based on a CBVH does not require any collimating optics (i.e., an input slit and a collimating lens or mirror) to operate. It should be noted that the y-component of the reading beam will not be affected by the CBVH. Therefore, the hologram will only modify the properties of the beam in the x-direction. Furthermore, these properties are independent of those in the y-direction.

Figure 3:
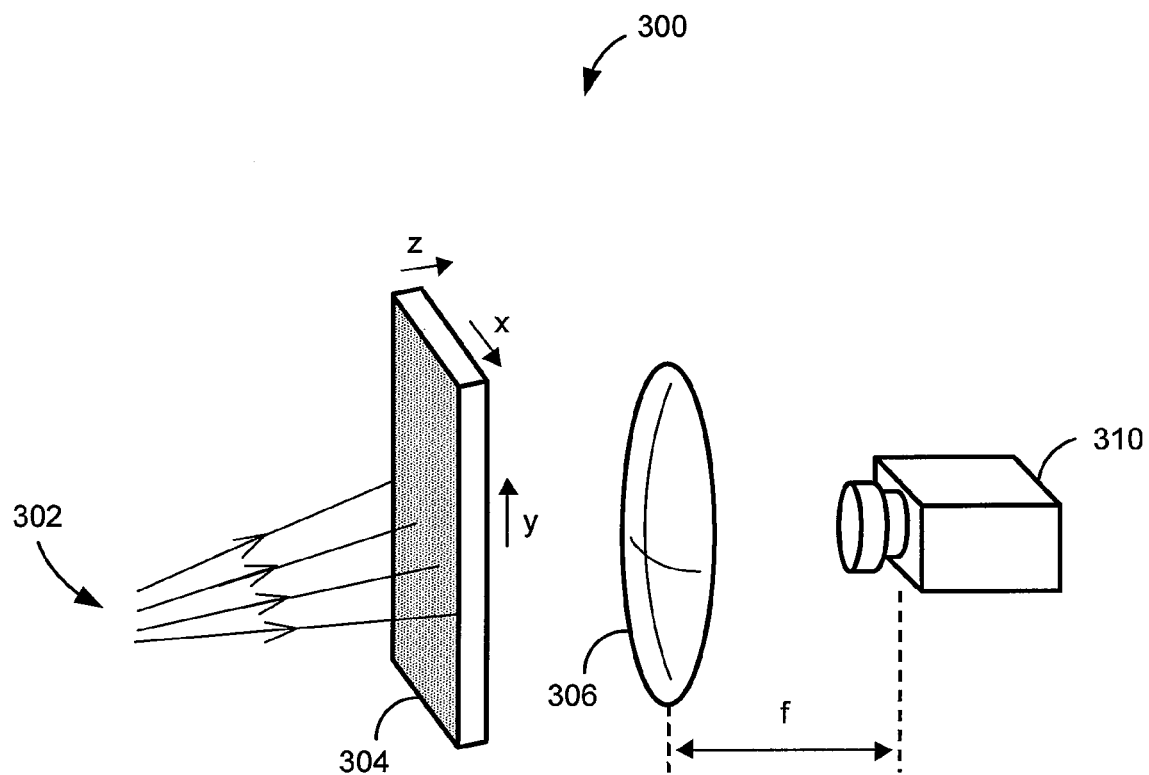
FIG. 3 is a diagram of an exemplary spectrometer incorporating the cylindrical beam volume hologram recorded from FIG. 1.

Reference is now made to FIG. 3, which is a diagram of an exemplary spectrometer incorporating the CBVH recorded from FIG. 1. In FIG. 3, the input beam 302 illuminates the hologram 304 primarily in the direction of the recording cylindrical beam. The diffracted beam from the hologram is then Fourier transformed using a lens 306 with a focal length f. For some embodiments, the lens 306 used in the spectrometer 300 may be either a spherical lens or a cylindrical lens, depending on the application. The output of the system is obtained using a CCD 310 located at the focal plane of the lens 306. In this regard, the spectrometer 300 may be utilized for two-dimensional spectral mapping. Furthermore, it should be emphasized that the CBVH 304 is not sensitive to the incident angles of the input beams (as explained above). This makes the use of CBVHs 304 suitable for diffuse light spectroscopy. As such, the spectrometer 300 is capable of dispersing diffuse light beams without the use of an input slit and a collimating lens or mirror.

FIGS. 4A-4D illustrate various outputs detected by a charge coupled device in the exemplary spectrometer from FIG. 3. To further illustrate some of the novel features of the CBVH, a white light is first passed through a monochromator. The output of the monochromator serves as the input into the spectrometer 300. As a non-limiting illustration, a spherical lens with a focal length of f=10 cm is utilized in the spectrometer setup of FIG. 3. Furthermore, the spherical lens is selected such that the ratio of the focal length for the lens to the lens diameter is F#=3.8. FIGS. 4A and 4B illustrate the outputs detected at the CCD 310 where the input beams have wavelengths $\lambda=500$ nm and $\lambda=532$ nm, respectively. It should be noted that while the spatial locations of the outputs vary in the x-direction as the wavelength changes, the outputs remain unchanged in the y-direction. The limited size in the y-direction is attributed to the limited divergence angle of the input beams in the y-direction.

To increase the divergence angle of the input beams in the y-direction, a rotating diffuser is inserted after the monochromator but in front of the CBVH 304. The addition of the rotating diffuser simulates an incoherent input beam. The outputs which correspond to the diffuse input beams at wavelengths λ=500 nm and λ=532 nm, respectively, are shown in FIGS. 4C and 4D. It should be noted that the spatial locations of the outputs in the x-direction remain the same as those in FIGS. 4A and 4B. However, the outputs span a greater distance in the y-direction. This is attributed to the wider range of incident angles in the input beam. Thus, as can be seen in FIGS. 4A-4D, a spectrometer 300 incorporating a CBVH 304 performs spectral separation in the x-direction for both diffuse and non-diffuse input beams while not affecting the beam in the y-direction. For the results shown in FIGS. 4A-4D, the input beam 302 undergoes a Fourier transformation in the y-direction because it is only affected by the spherical lens. It should be noted that if a cylindrical lens is used after the CBVH 304 rather than a spherical lens, the input beam 302 remains unchanged in the y-direction. That is, the input beam 302 is only affected in the x-direction and not the y-direction.

FIGS. 5A-5B illustrate various outputs detected by a charge coupled device in the exemplary spectrometer from FIG. 3 where a lens with higher focusing power compared to the one used in FIGS. 4A-4D is utilized. In another non-limiting illustration, the spherical lens has a smaller focal length-to-lens diameter ratio (F#=0.75) and smaller focal length (f=1.9 cm) is compared to the lens used for FIGS. 4A-4D. These parameters are chosen in order to provide a higher degree of focusing in the y-direction. The results are shown in FIGS. 5A and 5B for the incident wavelength of λ=532 nm.

FIG. 5A reflects the output detected with no diffuser place in front of the CBVH such that a non-diffuse input beam enters the spectrometer. FIG. 5B shows the output detected with a rotating diffuser incorporated into the system (to generate a diffuse input beam). When compared to FIGS. 4A-4D, the distance in which the output spans in the y-direction is notably smaller in FIGS. 5A and 5B. Thus, the power distributed over a vertical strip in the y-direction is localized to a limited distance in the y-direction and the intensity to be detected is accordingly increased. It should be noted that the increase in the intensity achieved by focusing the input beam in the y-direction is ultimately limited by the Lagrange invariant of the system (or more generally by the constant radiance theorem). However, maximum intensity at the output can be achieved utilizing exemplary embodiments of the CBVH for even partially incoherent sources.

Figure 6:
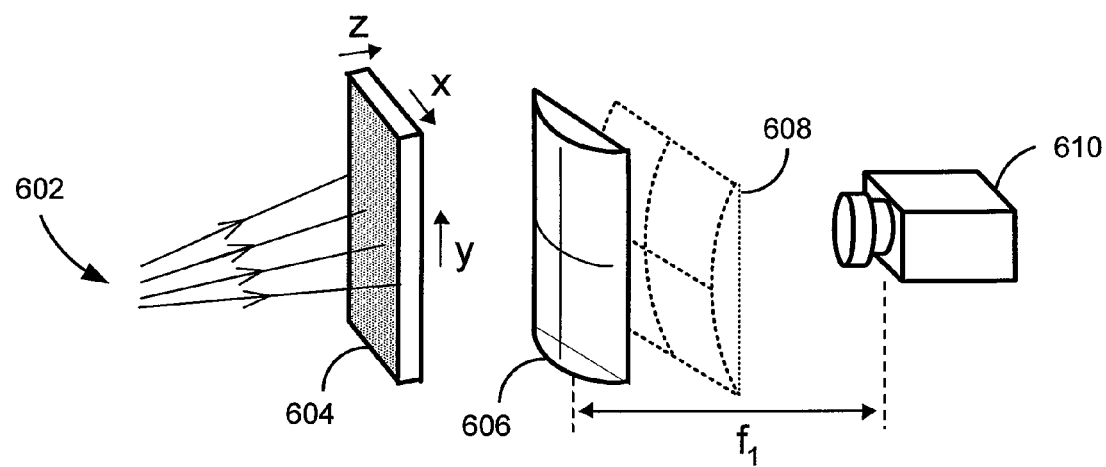
FIG. 6 is a diagram of an exemplary embodiment of a spectrometer incorporating the cylindrical beam volume hologram from FIG. 1 showing how one or two cylindrical lenses are utilized.

FIG. 6 is a diagram of an exemplary embodiment of a spectrometer incorporating the cylindrical beam volume hologram from FIG. 1 showing how one or two cylindrical lenses are utilized. It should be noted that for exemplary embodiments, a cylindrical lens 606 is used to perform a Fourier transform in the x-direction. Using another cylindrical lens 608 perpendicular to the cylindrical lens 606 used for performing the Fourier transform, the input beam 602 can be modified in the y-direction independently. This second lens 608 can be used to provide a higher degree of focusing in the y-direction. As discussed earlier, the input beam is unaffected by the hologram in the y-direction. Therefore, if the input beam is diverging in nature, the output at the CCD 610 will also be diverging in nature after the beam passes through the hologram and the first lens. Thus, the second cylindrical lens 608 is placed after the first cylindrical lens 606 such that the second lens 608 is orthogonal with respective to the first cylindrical lens 606 in order to focus the output in the y-direction.

In this case, the input beams can be mapped (or focused) to different spatial locations in the y-direction at the CCD 610. In this regard, the second cylindrical lens 608 focuses the output to specific locations at the CCD 610. In an alternative embodiment, the lens may be used to obtain the image of the hologram 604 at the CCD 610 in the y-direction. Since the diffracted beam propagates through different lenses 606, 608 in the x- and y-directions, respectively, the system provides spectral diversity in the x-direction while it maps the hologram 604 at the CCD 610 in the y-direction. It should be emphasized that this enables a degree of freedom in the design of the hologram in the y-direction. It should be noted that in alternative embodiments, the second cylindrical lens 608 can also be placed before the first cylindrical lens 606 to obtain similar results. It should be further noted that the functionality of the first cylindrical lens 606 can be further integrated into the volume hologram if the CBVH is recorded using two cylindrical beams. In this regard, for the recording arrangement shown in FIG. 1, the plane wave should be replaced by a converging cylindrical beam focused after the hologram. The interface of a diverging cylindrical beam with a converging cylindrical beam is recorded inside the hologram. Therefore, it should be appreciated that the spectrometer arrangement becomes even more compact for such embodiments. Furthermore, the functionalities of the first lens 606 and the second lens 608 might be integrated into the CBVH if the recording plane wave of the arrangement in FIG. 1 is replaced by a beam that is converging in both x- and y-directions. This results in further reduction of the number of elements and the size of the spectrometer.

Figure 7:
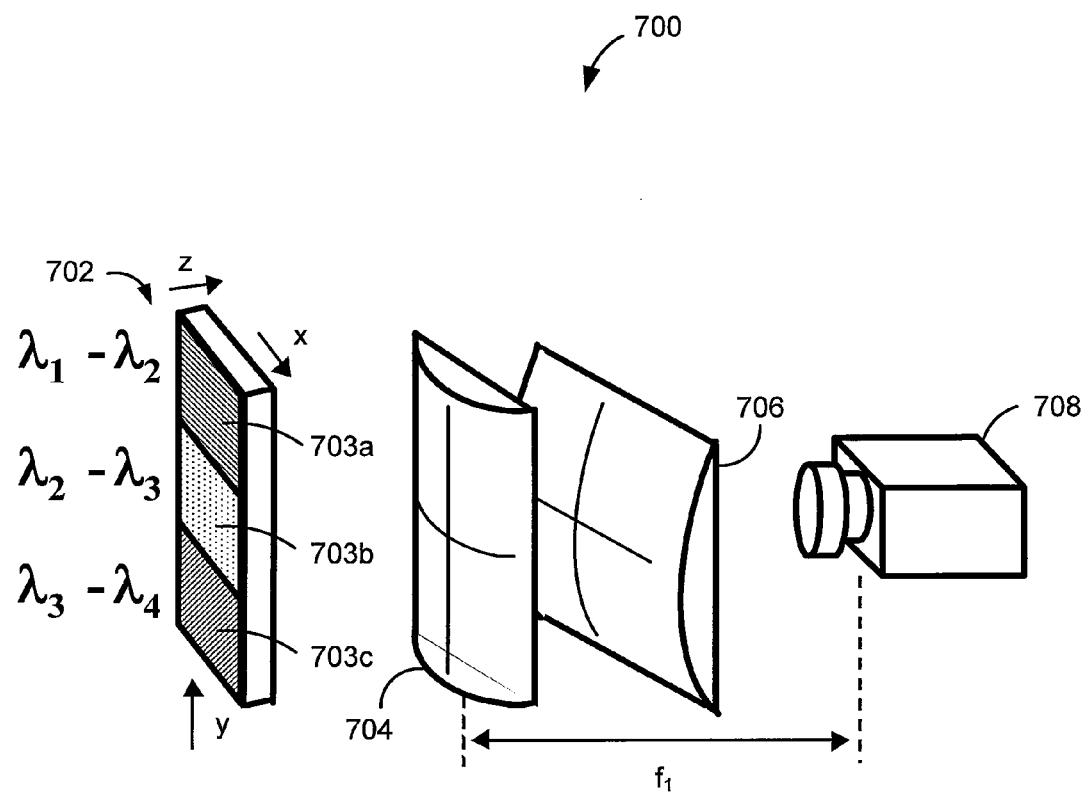
FIG. 7 is a diagram of an alternative embodiment of a spectrometer incorporating the cylindrical beam volume hologram from FIG. 1 where different wavelength ranges are diffracted from different locations of the hologram and mapped to different segments on the CCD in the y-direction.

For some embodiments, the hologram can be divided in the y-direction into several regions or segments. Within each region, a corresponding hologram may be recorded to map a certain range of wavelengths of the input beam to a specific location in the output. Reference is now made to FIG. 7, which is a diagram of an alternative embodiment of a spectrometer incorporating the cylindrical beam volume hologram from FIG. 1 where different wavelength ranges are diffracted from different locations of the hologram and mapped to different segments on the CCD in the y-direction. FIG. 7 shows an embodiment where three different segments 703a, 703b, 703c are recorded in the CBVH 702. In the arrangement shown, the top hologram 703a diffracts the input beam in the range of $\lambda_1$ to $\lambda_2$. The spectral range corresponding to the middle hologram 703b diffracts the input beam in the range of $\lambda_2$ to $\lambda_3$. Likewise, the bottom hologram 703c diffracts the input beam in the range of $\lambda_3$ to $\lambda_4$. Therefore, the one-dimensional spectral diversity is mapped onto two dimensions at the CCD 708. In this regard, embodiments of the hologram 702 described in FIG. 7 is spatially multiplexed to provide two-dimensional spectral-spatial mapping (i.e. spectral wrapping).

It should be appreciated that in this respect, the use of the design flexibility in the y-direction is not limited to the cases described here. The spectral wrapping technique may also be used in conjunction with thicker recording material in order to improve both resolution and spectral range. While there are some trade-off between the ultimate resolution and operating spectral range in every spectrometer, the optimal use of the spectral wrapping property of CBVH spectrometer minimizes this trade-off. It should be noted that the "segmented" or partitioned hologram 702 may be recorded in either a single step or in sequential steps, depending on the recording setup utilized. For example, a spatial light modulator or a mask may be incorporated into the setup. Also, since the holograms 702 are recorded onto different regions or segments 703a-c of the recording material, the full dynamic range of the material can be used for recording each hologram 702 to obtain high diffraction efficiency.

In other embodiments, the spectral wrapping can be obtained by angularly multiplexing a plurality of CBVHs in the y-direction. Different holograms can be multiplexed using the same cylindrical beam and several plane waves with different angles of propagation in the y-direction. The arrangement of the spectrometer for this embodiment is similar to the arrangement shown in FIG. 7. In other embodiments, both cylindrical lenses can be used to obtain the Fourier transform of the beam in both directions. In yet other embodiments, the combination of the two lenses can be implemented using a spherical lens.

Figure 8:
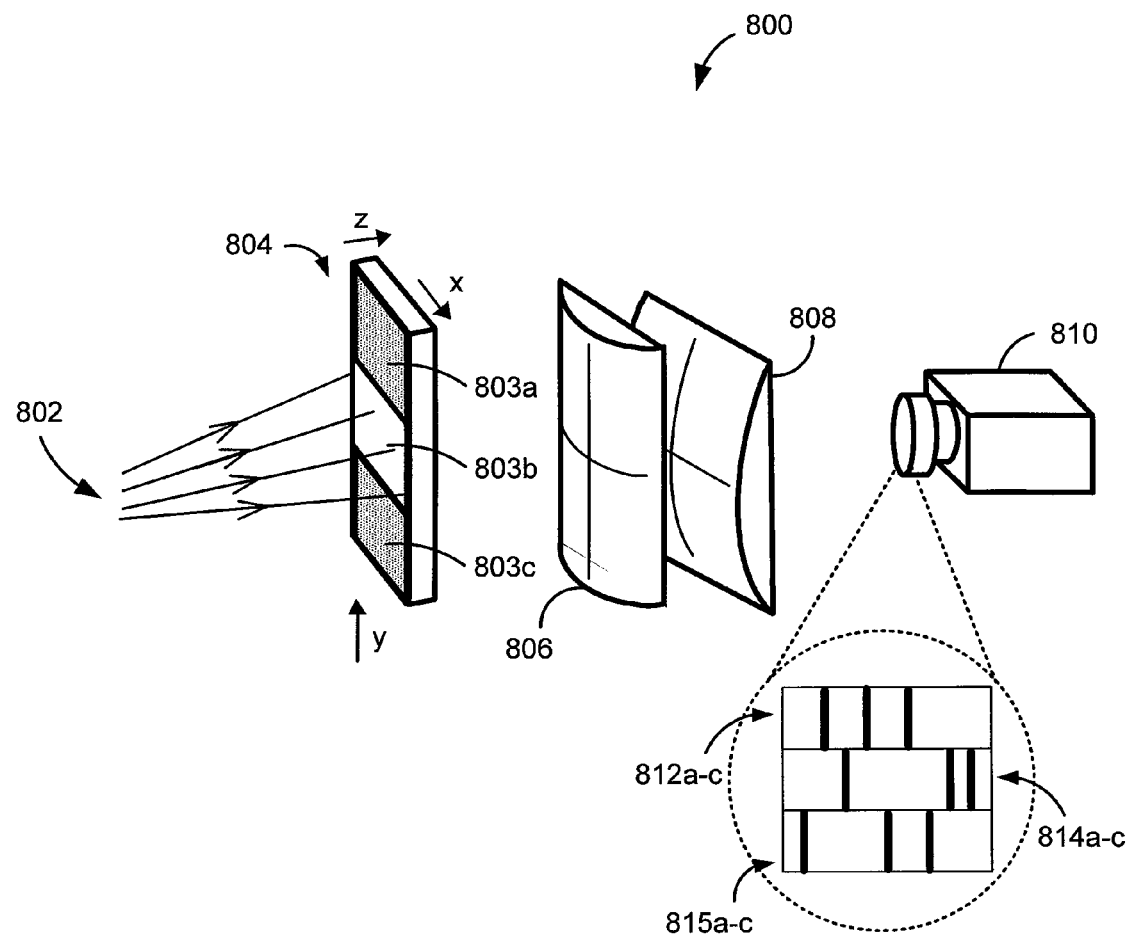
FIG. 8 is a diagram of an alternative embodiment of a spectrometer incorporating the cylindrical beam volume hologram from FIG. 1 where different segments of the hologram in the y-direction are angularly multiplexed to provide different spatial-spectral maps on different segments of the CCD in the y-direction.

In other embodiments, multiple holograms may be multiplexed to a particular segment. Reference is now made to FIG. 8, which is a diagram of an alternative embodiment of a spectrometer incorporating the cylindrical beam volume hologram from FIG. 1 where different segments of the hologram in the y-direction are utilized. In these segments, different holograms are angularly multiplexed in the x-direction to provide different spatial-spectral maps on different segments of the CCD in the y-direction. FIG. 8 shows the segmented CBVH 804 from FIG. 7 but where multiple holograms are angularly multiplexed in the x-direction into each segment 803a-c. The resulting spectral-spatial mappings which correspond to the segment 803a, 803b, and 803c are shown as different patterns 815a-c, 814a-c, 812a-c on the CCD 810, respectively, for reading with a monochromatic beam. Therefore, each wavelength is mapped to more than one location in each segment since it is diffracted from an angularly multiplexed hologram. The maps for different wavelength may overlap in each segment, but the difference in the mappings of different segments provide enough information to obtain the correct contribution of each wavelength in the spectrum of the input beam.

To incorporate angular multiplexing, multiple holograms are recorded by varying the incident angle of the plane waves. Thus, each angle-multiplexed CBVH may be recorded using a fixed cylindrical beam and a plane wave with a different (adjustable) incident angle with respect to the other holograms. As a non-limiting example, three different incident angles would be used to record three different holograms.

In the non-limiting example shown in FIG. 8, three different holograms are multiplexed into a single segment 803a. Using one segment 803a-c of the hologram, the total power in the output corresponding to a monochromic input may be increased by a factor of approximately 3 times when compared to the case where a single CBVH is used, since three diffraction components will be collected at the CCD 810. Each wavelength component is mapped to three vertical strips 812a-c, 814a-c, 815a-c, as shown in FIG. 8. However, it should be noted that the resolution is reduced since a larger region is assigned to one input wavelength. If the segments 803a-c of the hologram 804 are designed differently to provide independent mapping conditions in different segments for each input wavelength component, post processing may be used to compensate for the reduction in the resolution. In each segment 803a-c, the output signal 812a-c, 814a-c, 815a-c corresponding to different wavelength components overlap in the output plane, but the independent mapping obtained using multi-segmented hologram 804 provides enough information to solve for (or estimate) the correct spectral contents of the input beam. In this regard, coded spectroscopy is achieved using angular multiplexing in each segment and spatial multiplexing of different segments, and results in an increase in the power detected for a given wavelength without sacrificing the resolution.

Figure 9:
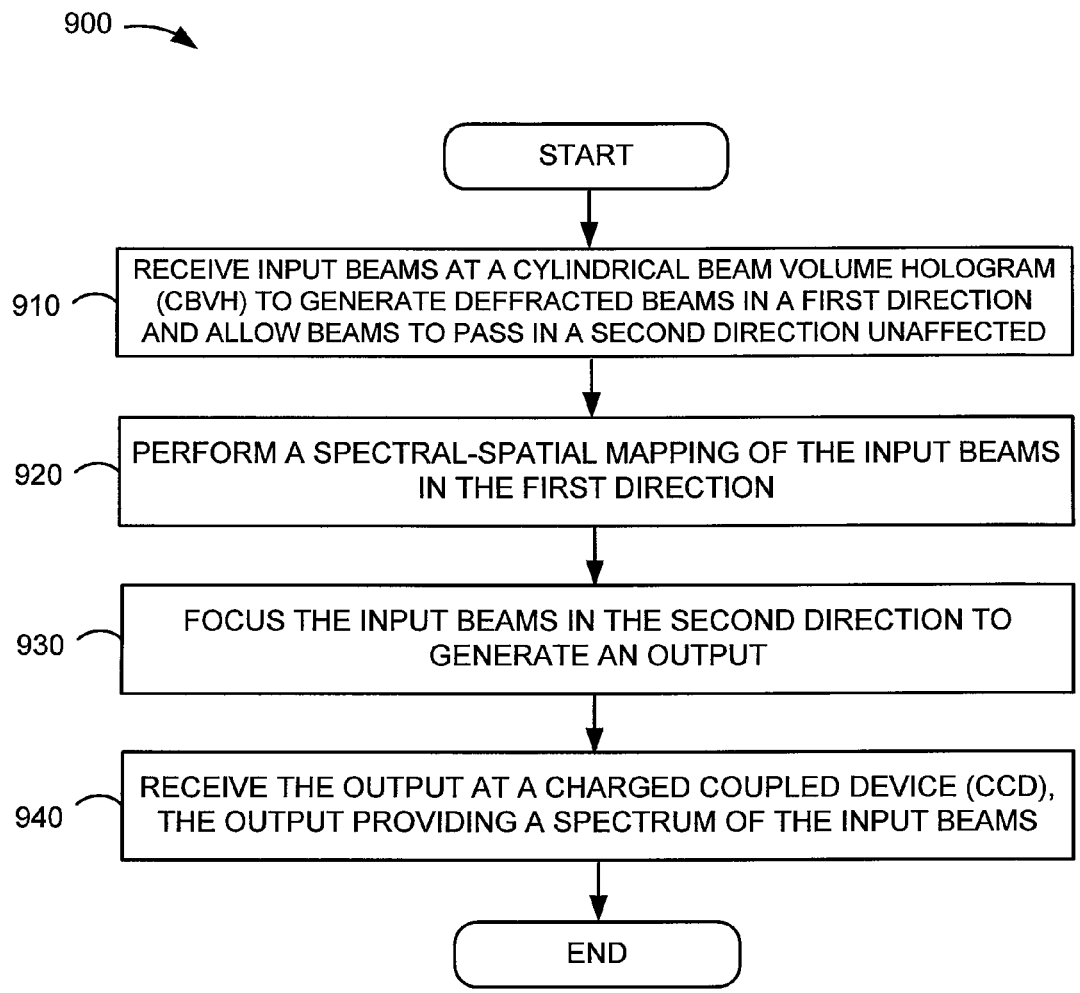
FIG. 9 is a flowchart for an embodiment of a method for performing spectral analysis using the spectrometer in FIG. 6.

Reference is made to FIG. 9, which is a flowchart for an embodiment of a method for performing spectral analysis using the spectrometer in FIG. 6. Beginning in step 910, input beams are received at a cylindrical beam volume hologram (CBVH) where diffracted beams are generated in a first direction and the beam is allowed to pass through unaffected in a second (orthogonal) direction. In step 920, a spectral-spatial mapping is performed on the input beams in a first direction. In step 930, the input beams are focused in the second direction to generate an output. In step 940, the output is received at a charged coupled device (CCD) where the output provides a spectrum of the input beams.

Figure 10:
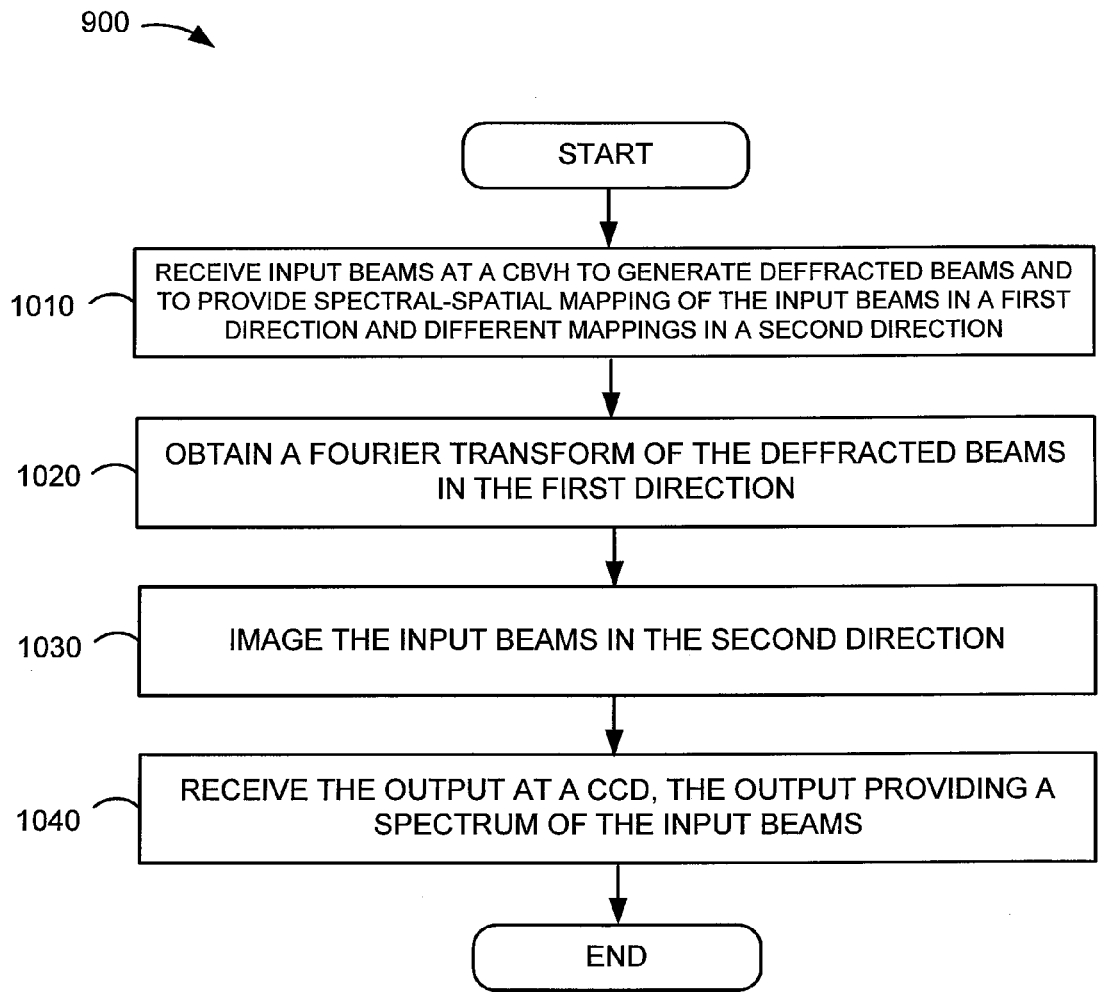
FIG. 10 is a flowchart for an alternative embodiment of a method for performing spectral analysis using the spectrometer in FIG. 6.

Reference is made to FIG. 10, which is a flowchart for an alternative embodiment of a method for performing spectral analysis using the spectrometer in FIG. 6. Beginning in step 1010, input beams are received at a cylindrical beam volume hologram (CBVH) to generate diffracted beams and to provide spectral-spatial mapping of the input beams in a first direction and different mappings in a second direction. In step 1020, a Fourier transform is obtained for the diffracted beams in the first direction. Next, in step 1030, the input beams are imaged (or focused) in the second direction. In step 1040 the output is received at a charged coupled device (CCD), the output providing (with possible post-processing) a spectrum of the input beams.

Tandem Fabry-Perot CBVH Spectrometer

Embodiments described herein include systems and methods for utilizing a Fabry-Perot etalon in tandem with a cylindrical beam volume hologram (CBVH) to perform diffuse light spectroscopy. Embodiments of the tandem configuration achieve high resolution and take advantage of the large spectral operating range of CBVH-based spectrometers. Such embodiments provide a more compact and less expensive means for performing spectroscopy that is less sensitive to optical alignment than conventional spectrometers. Also, it should be appreciated that embodiments of the tandem spectrometer disclosed herein encode the spectral information of the input beam into a 2D spatial pattern at the output plane, thereby resulting in more efficient use of a CCD.

Generally, to determine the spectral characteristics of an arbitrary beam, a mapping is performed of the scalar quantity of the spectrum (i.e., light intensity vs. different wavelengths) associated with the beam onto different spatial locations in an output plane. Typically, the spectrum of the input beam is spatially mapped along a line in the output plane. This mapping can be efficiently implemented by modifying the beam only in one direction while the beam remains intact in the other direction.

As briefly described earlier, a key component in spectrometers is the wavelength sensitive (or dispersive) component that provides separation of different wavelength channels for detection purposes. Holograms (or gratings) are well-known candidates for achieving this because of their wavelength selectivity, which results in non-uniform diffraction of different wavelength channels of a collimated optical beam. Most of the optical spectrometers built based on this phenomenon exploit surface relief or thin film gratings, which primarily have single grating vectors. Exemplary embodiments of CBVHs are recorded using either a plane wave and a single cylindrical beam formed by a cylindrical lens or two cylindrical beams formed by two cylindrical lenses. The CBVHs are then further utilized to derive a compact, slitless, diffuse light spectrometer. For embodiments of the spectrometer systems described herein, CBVHs are utilized in tandem with a Fabry-Perot etalon to achieve 2D spectral-spatial mapping for spectroscopy. The functions of the Fabry-Perot etalon and the CBVH within a spectrometer are now discussed.

Figure 11A:
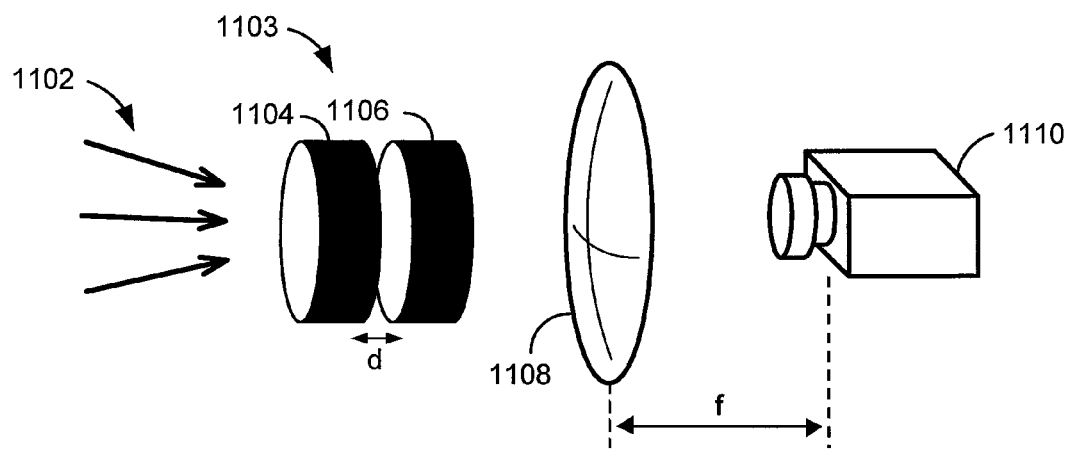
FIG. 11A shows an embodiment of a Fabry-Perot spectrometer.

Reference is made to FIG. 11A, which shows an embodiment of a Fabry-Perot spectrometer. Generally, the Fabry-Perot etalon 1103 is a basic example of an inteferometric device, or a device that superposes two or more waves and creates an output wave different from the input waves. The output is utilized to analyze the differences in wavelength characteristics of the input waves. The Fabry-Perot spectrometer shown in FIG. 11A is composed of two dielectric mirrors 1104, 1106, each with a reflectivity R. Furthermore, the two dielectric mirrors 1104, 1106 are arranged such that there is a fixed air gap, denoted by a thickness d, between the mirrors 1104, 1106. A CCD 1110 is used to detect the output and is placed at the focal plane of a spherical lens 1108 with a focal length f, as shown in FIG. 11A. In this respect, Fabry-Perot etalon 1103 contains planar surfaces that are all partially reflecting so that multiple rays of light are responsible for the generation of interference patterns. Fabry-Perot etalon 1103 causes multiple reflections that reinforce the areas where constructive and destructive effects occur, thereby making the resulting fringes much more clearly defined. Constructive interference occurs if the transmitted beams are in phase, and this corresponds to a high-transmission peak of the etalon. If the transmitted beams are out of phase, destructive interference occurs and this corresponds to a transmission minimum. As such, this effect provides for much more precise measurements of wavelength and free spectral range (FSR).

Figure 11B:
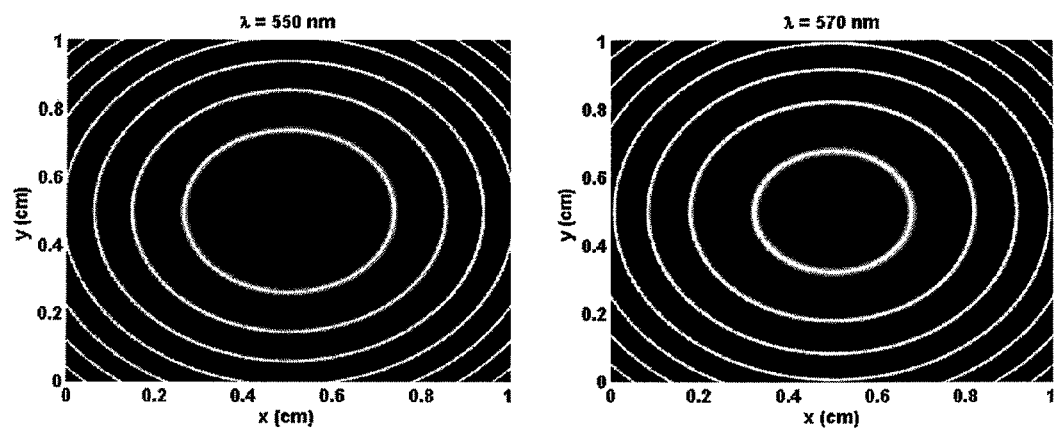
FIG. 11B shows the transmission response as a function of frequency for the Fabry-Perot spectrometer in FIG. 11A.

FIG. 11B shows the transmission response as a function of frequency for the Fabry-Perot spectrometer in FIG. 11A. Specifically, FIG. 11B shows simulation results corresponding to wavelengths $\lambda=550$ nm and $\lambda=570$ nm based on the following parameters: a mirror reflectivity set to (R=0.8), the air gap thickness (d=50 μm), and the focal length of the lens set to (f=5 cm). Furthermore, for this non-limiting example, the input beam 1102 is diffuse or spatially incoherent in nature. As seen in FIG. 11B, for a diffuse source 1102 composed of all possible wavevectors in the air and for each input wavelength, the output spectrum of the Fabry-Perot etalon has a circularly symmetric spectral-spatial pattern at the Fourier plane of the lens. That is, when focused by a lens (such as a spherical lens), the interference fringes form concentric circles at the output plane. As such, one should note that all the spectral information is encoded in only one direction within a single line along the radii of the fringes with no spectral information encoded in the other direction (i.e., the azimuthal direction along the perimeter of the circles).

The scalar nature of the output spectrum thus requires separation of the individual wavelength components in only one direction in the spatial domain. However, it should also be noted that one apparent shortcoming of the Fabry-Perot spectrometer in FIG. 11A is that the spectrometer fails to take advantage of the 2D capability of most optical detectors. More specifically, the Fabry-Perot spectrometer shown in FIG. 11A fails to provide a true 2D spectral-spatial mapping at the output plane captured by the CCD 1110.

Figure 12:
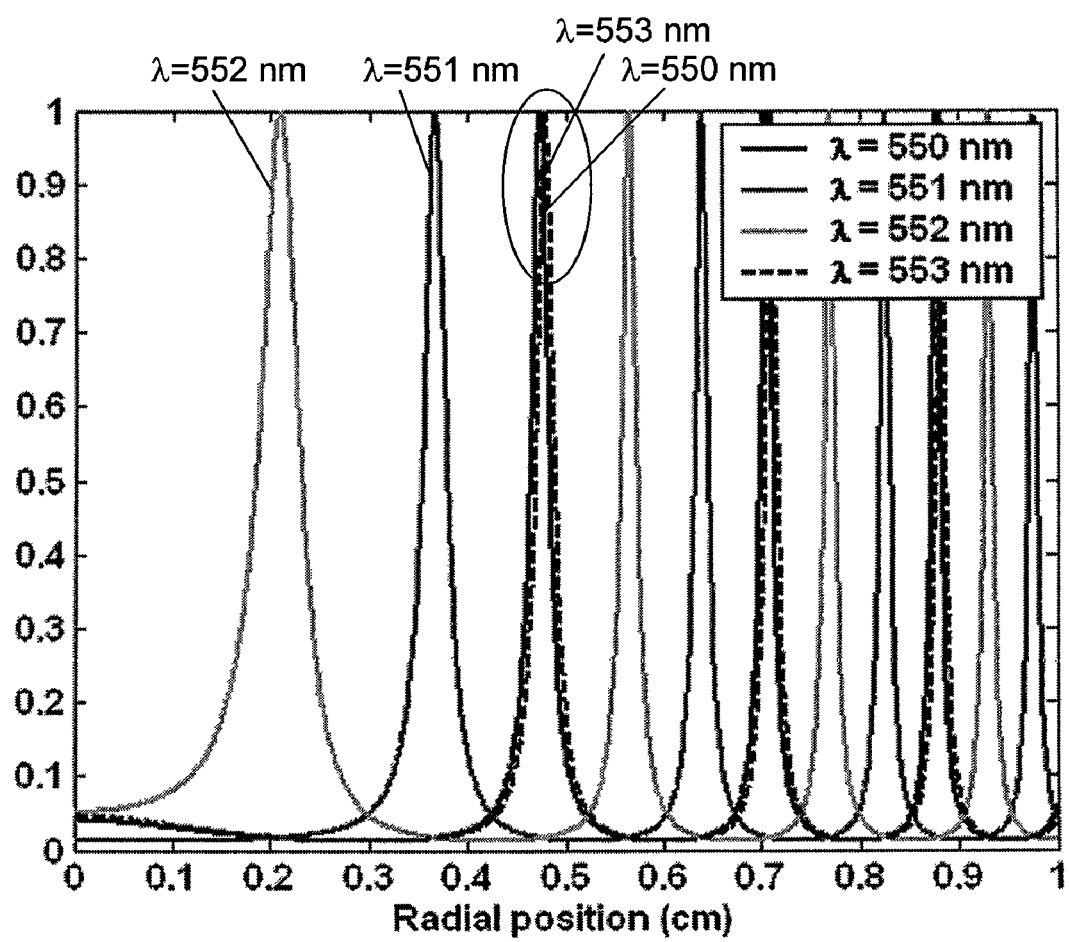
FIG. 12 shows the periodic spectral transmission response for the Fabry-Perot spectrometer from FIG. 11A where the spectrometer has a free spectral range (FSR) of 3 nm.

Furthermore, another perceived shortcoming of the Fabry-Perot spectrometer shown in FIG. 11A is the periodicity of its transmission response in the frequency domain. Ultimately, the spectral operating range of the spectrometer is limited to the FSR of the Fabry-Perot etalon 1103. The FSR is defined as the spacing between two resonance peaks in the frequency domain. By way of illustration, reference is made to FIG. 12, which shows the periodic spectral transmission response for the Fabry-Perot spectrometer from FIG. 11A with a 50 micron air gap where the spectrometer has a FSR of 3 nm. The transmission response is shown for wavelengths $\lambda=550$, $\lambda=551$, $\lambda=552$, and $\lambda=553$ nm. It should be noted that the spectrum of the Fabry-Perot etalon is degenerate when its FSR is exceeded as evidenced by the overlapping of the transmission response for certain wavelengths. As clearly seen in FIG. 12, the output pattern which corresponds to $\lambda=553$ nm overlaps with the output pattern corresponding to $\lambda=550$ nm. This coincides with an FSR of 3 nm for the Fabry-Perot etalon in the non-limiting example. As known by those skilled in the art, the FSR is dependent on the wavelength. Thus, the overlapping of these outputs (at $\lambda=550$ nm and $\lambda=553$ nm) illustrates that the output spectrum of the Fabry-Perot spectrometer shown in FIG. 11A is degenerate for wavelengths spaced by 3 nm, the FSR value. Because of this characteristic, a Fabry-Perot etalon 1103 can be practically used as a high resolution spectrometer but with only a small spectral operating range for diffuse source spectroscopy. However, it should be noted that this unique property of Fabry-Perot etalons may be utilized in combination with diffuse source spectrometers which have large spectral ranges of operation, as will now be discussed.

Figure 13:
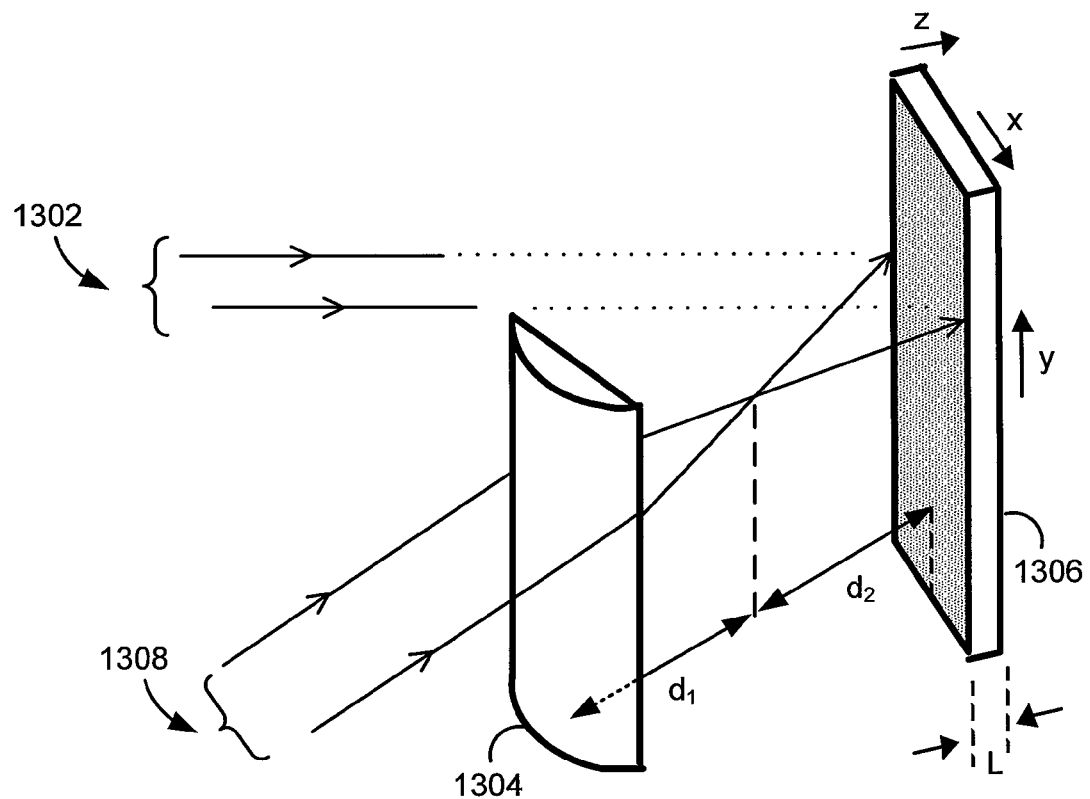
FIG. 13 is a diagram of an exemplary setup for recording a cylindrical beam volume hologram (CBVH).

One class of diffuse source spectrometers may be implemented by incorporating volume holograms such as spherical beam volume holograms and cylindrical beam volume holograms. Reference is now made to FIG. 13, which is a diagram of an exemplary setup for recording a CBVH. As described earlier, the CBVH 1306 can be recorded using a plane wave 1302 and a cylindrical beam 1308 formed by a cylindrical lens 1304. As illustrated in FIG. 13, the focal plane of the cylindrical beam occurs at a distance $d_1$ behind the lens 1304 and at a distance $d_2$ in front of the hologram 1306. Furthermore, as depicted in FIG. 13, the hologram 1306 has a thickness L. Depending on the application, the exemplary setup shown in FIG. 13 may be modified by adjusting the incident angles of the plane wave 1302 and the cylindrical beam 1308. It should be noted that beyond the cylindrical lens 1304, the beam 1308 is focused in the x-direction while it remains unmodified in the y-direction. The interference pattern between the signal beam and the reference beam is recorded onto the hologram 1306.

Figure 14A:
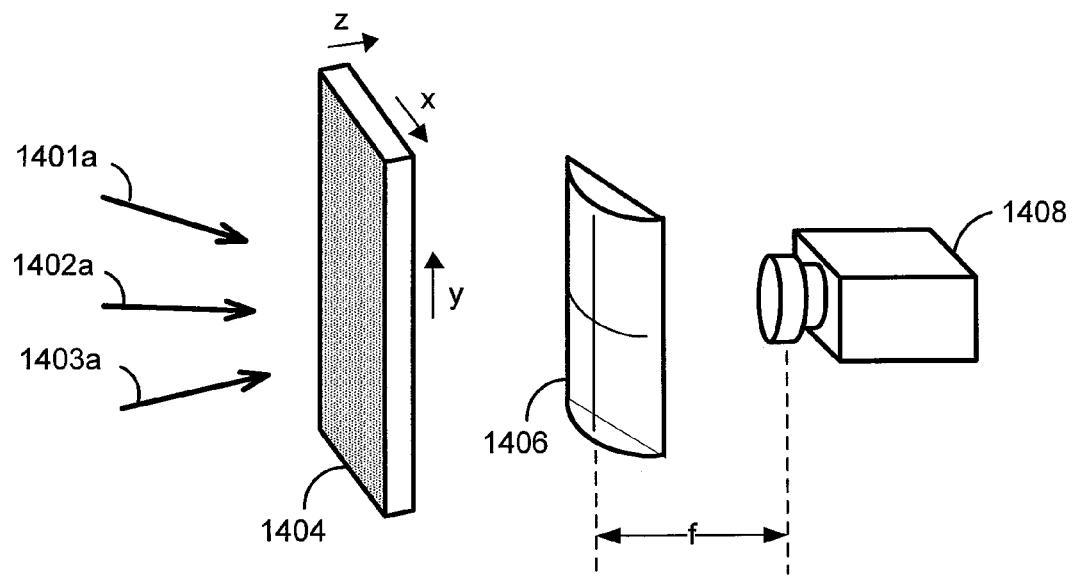
FIG. 14A is a diagram of an embodiment of a spectrometer incorporating the CBVH recorded from FIG. 13.

FIG. 14A is a diagram of an embodiment of a spectrometer incorporating the CBVH recorded from FIG. 13. It should be noted that for exemplary embodiments, a cylindrical lens 1406 may also be used to perform a Fourier transform in the x-direction. As described above, the beam profile in the y-direction can be easily obtained by considering the propagation from the input plane to the output. The CBVH 1404 in FIG. 14A diffracts different wavelengths of the input diffuse beam 1401a, 1402a, 1403a along the x-direction and does not modify them in the y-direction. Different holograms can be spatially multiplexed in different segments of the hologram 1404 in the y-direction. It should be noted that a "segmented" or partitioned hologram 1404 may be recorded in either a single step or in sequential steps, depending on the recording setup utilized. For example, a spatial light modulator or a mask may be incorporated into the setup. Also, since the holograms 1404 are recorded onto different regions or segments of the recording material, the full dynamic range of the material can be used for recording each hologram 1404. Using such a segmented hologram, the spectral operating range of the spectrometer can be further increased.

Figure 14B:
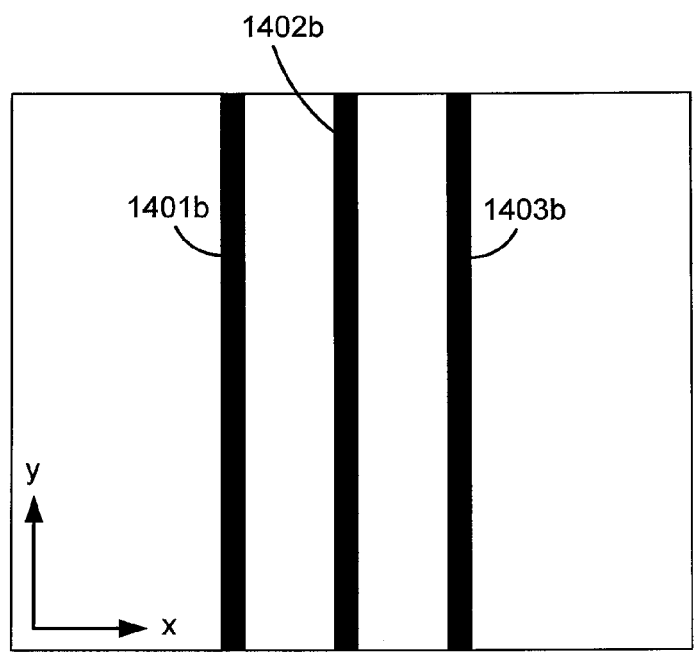
FIG. 14B illustrates the output detected by a charge coupled device (CCD) in the CBVH spectrometer in FIG. 14A.

In this respect, it should be appreciated that for certain embodiments, it is possible to form the CBVH by utilizing two cylindrical beams to remove the lens 1406 in order to form a more compact lensless structure. Reference is now made to FIG. 14B, which illustrates the output 1401b, 1402b, 1403b detected by a CCD 1408 in the CBVH spectrometer in FIG. 14A. While the spectral properties of the input beam are detected in a specific direction in the output plane (i.e., along the x-axis in FIG. 14B), an orthogonal direction (i.e., along the y-axis in FIG. 14B) may be utilized to independently modify the beam through the system as the CBVH does not affect the beam in this direction. The light distribution at the Fourier plane of the cylindrical lens is degenerate along the y-direction.

As described in detail earlier, it should be further noted that this attribute of CBVHs distinguishes CBVHs from other types of volume holograms used for the formation of 2D spatial-spectral maps. Based on the independent functionality of the spectrometer in two orthogonal directions, unique applications can be realized by using CBVHs. Furthermore, unlike simple gratings, CBVHs are not sensitive to the incident angles of the input beams, thus making the CBVH highly suitable for diffuse light spectroscopy. As such, the CBVH practically acts as a low resolution, large spectral operating range spectrometer capable of dispersing diffuse light with no input slit.

Figure 15A:
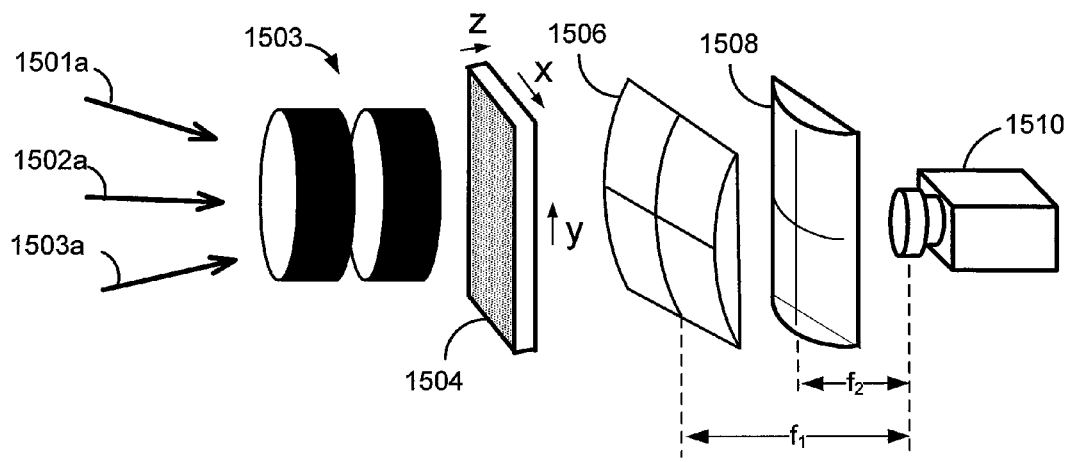
FIG. 15A is a diagram of an exemplary embodiment of a spectrometer incorporating a Fabry-Perot etalon in tandem with a CBVH.

Exemplary embodiments of tandem spectrometers utilize the properties of this class of diffuse source spectrometers in combination with those of the Fabry-Perot etalon to achieve high resolution diffuse light spectroscopy over a large spectral range. Reference is now made to FIG. 15A, which is a diagram of an exemplary embodiment of a spectrometer incorporating a Fabry-Perot etalon in tandem with a CBVH. By cascading a Fabry-Perot etalon 1503 with a CBVH 1504, a high resolution spectrometer with a large spectral operating range can be derived. As shown in the exemplary setup in FIG. 15A, the Fabry-Perot etalon 1503 is placed in front of the CBVH 1504. It should be further noted that for exemplary embodiments, a cylindrical lens 1508 may be used to perform a Fourier transform in the x-direction. Using a cylindrical lens 1506 perpendicular to the cylindrical lens 1508 used for performing the Fourier transform, the input beam 1501a, 1502a, 1503a can be modified in the y-direction independently. The lens 1506 can be used to provide a higher degree of focusing in the y-direction. As discussed earlier, the input beam is unaffected by the hologram in the y-direction. Therefore, if the input beam is diverging in nature, the output at the CCD 1510 will also be diverging in nature after the beam passes through the hologram. Thus, the cylindrical lens 1506 is placed before the cylindrical lens 1508 such that the lens 1506 is orthogonal with respect to the cylindrical lens 1508 in order to focus (or Fourier transform) the output in the y-direction such that different wavelengths are mapped to different spatial locations at the CCD 1510. The first cylindrical lens 1506 has a focal length $f_1$ and the second cylindrical lens 1508 has a focal length $f_2$, as illustrated in FIG. 15A.

Figure 15B:
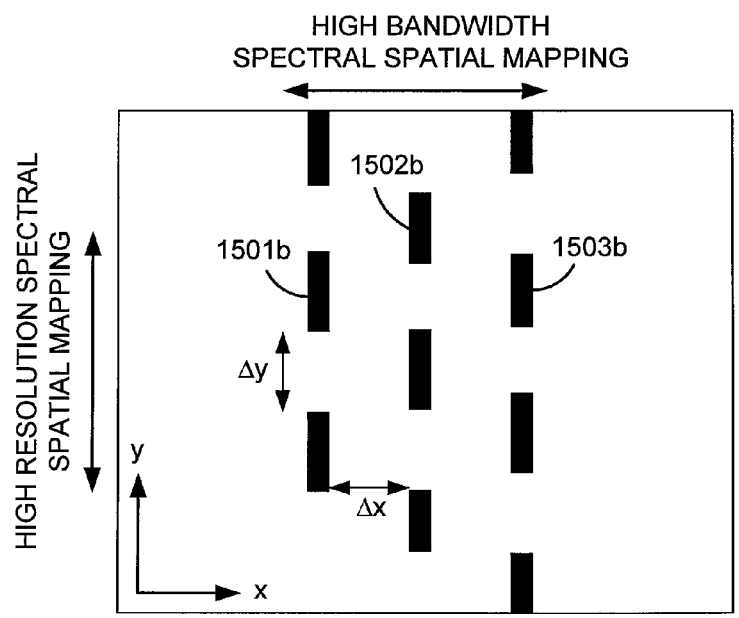
FIG. 15B illustrates the output detected by a CCD in the exemplary spectrometer in FIG. 15A.

FIG. 15B illustrates the output detected by a CCD 1510 in the exemplary spectrometer in FIG. 15A. It should be noted that the components in the drawings are not necessarily drawn to scale, and emphasis is placed upon clearly illustrating the principles described herein. As seen in FIG. 15B, the CBVH 1504 simply breaks the circular symmetry of the Fabry-Perot interference fringes and the Fabry-Perot simply removes the y-degeneracy from the CBVH 1504 spectrum to form a 2D spatial-spectral pattern in the co-Fourier plane of the two cylindrical lenses 1506, 1508. Since the x- and the y-directions are independently used in this configuration, a Fabry-Perot etalon 1503 can be designed to encode high resolution spectral information in the y-direction, and the CBVH can be designed to expand the spectral operating range in the x-direction.

In this respect, exemplary embodiments of spectrometers provide both high resolution and high bandwidth spectral-spatial mapping through the CBVH and Fabry-Perot etalon working in tandem, as illustrated in FIG. 15B. First, the CBVH provides coarse resolution but over a large spectral range. This is complemented by the Fabry-Perot etalon, which provides fine resolution within the spectral-spatial mapping generated by the CBVH. Referring to FIG. 15B, the Δy value (corresponding to wavelengths) may be very small and in some cases, may be several orders of magnitude smaller than the Δx between adjacent lines in the x-direction. In this respect, the Fabry-Perot etalon provides high resolution spectral mapping. Furthermore, the CBVH provides high bandwidth spectral mapping by providing the capability of mapping a large number of frequencies at the output in the x-direction.

For exemplary embodiments of the tandem spectrometer shown in FIG. 15A, the resolution of the CBVH is equal to the FSR of the Fabry-Perot structure such that the fine resolution of the tandem spectrometer is defined by the Fabry-Perot resolution while its spectral operating bandwidth is defined by the CBVH. In this exemplary embodiment, high performance is achieved in a very compact structure. It should be noted that in instances where the FSR of the Fabry-Perot etalon is smaller than the resolution of the CBVH, spectral ambiguity exists in the y-direction (i.e., the direction of fine resolution due to the Fabry-Perot etalon). Therefore, to remove this degree of ambiguity in resolving the spectrum of the unknown source, the maximum resolution of the CBVH should optimally be set equal to the FSR of the Fabry-Perot etalon for exemplary embodiments of the tandem spectrometer. This in turn guarantees that the 2D spectral-spatial mapping is invertible and there is no singularity in the spectrum estimation process. For instances where the FSR of the Fabry-Perot is larger than the resolution of the CBVH (for spatial coding in the x-direction), the vertical dimension (i.e., y-direction) is not optimally used for coding using the Fabry-Perot. That is, only the spatial range or the detector pixels corresponding to the wavelength range equal to the CBVH resolution are used, thereby resulting in reduction in the resolution.

In addition to the exemplary embodiments described above, alternative embodiments of the tandem spectrometer may be derived through various modifications. As a non-limiting example, the two cylindrical lenses in FIG. 15A can be replaced by a specially designed spherical lens. Furthermore, embodiments of spectrometers may be more compactly implemented by integrating the Fabry-Perot etalon and the two lenses into the CBVH to realize even more low-cost, compact slitless spectrometers.

Other embodiments provide for recording multiplexed volume holograms onto different segments of the hologram to achieve even greater density levels of 2D spectral-spatial encoding. For some embodiments, this may be achieved by performing angular multiplexing. To incorporate angular multiplexing, multiple holograms are recorded by varying the incident angle of the plane waves during the recording phase. Thus, each angle-multiplexed volume hologram may be recorded using a fixed cylindrical beam and a plane wave with a different (adjustable) incident angle with respect to the other holograms.

For other embodiments, fully-optimized volume holograms are derived by incorporating multiple grating vectors into the holograms. For such embodiments, each grating vector within the volume hologram is optimized by taking into account such parameters as the properties of the Fabry-Perot etalon, the requirements of the spectrometer, the material thickness available for recording the hologram, and the spectral operating range. Exemplary setups for recording such volume holograms are configured to pass a plane wave through a diffractive optical element designed to generate an optical pattern at the recording material in order to record the desired volume hologram. As such, embodiments of spectrometers incorporating these volume holograms are fully optimized to analyze diffuse light sources without the use of input slits and collimating lenses. This results in a more compact spectrometer with fewer alignment requirements compared to conventional spectrometers.

Figure 16:
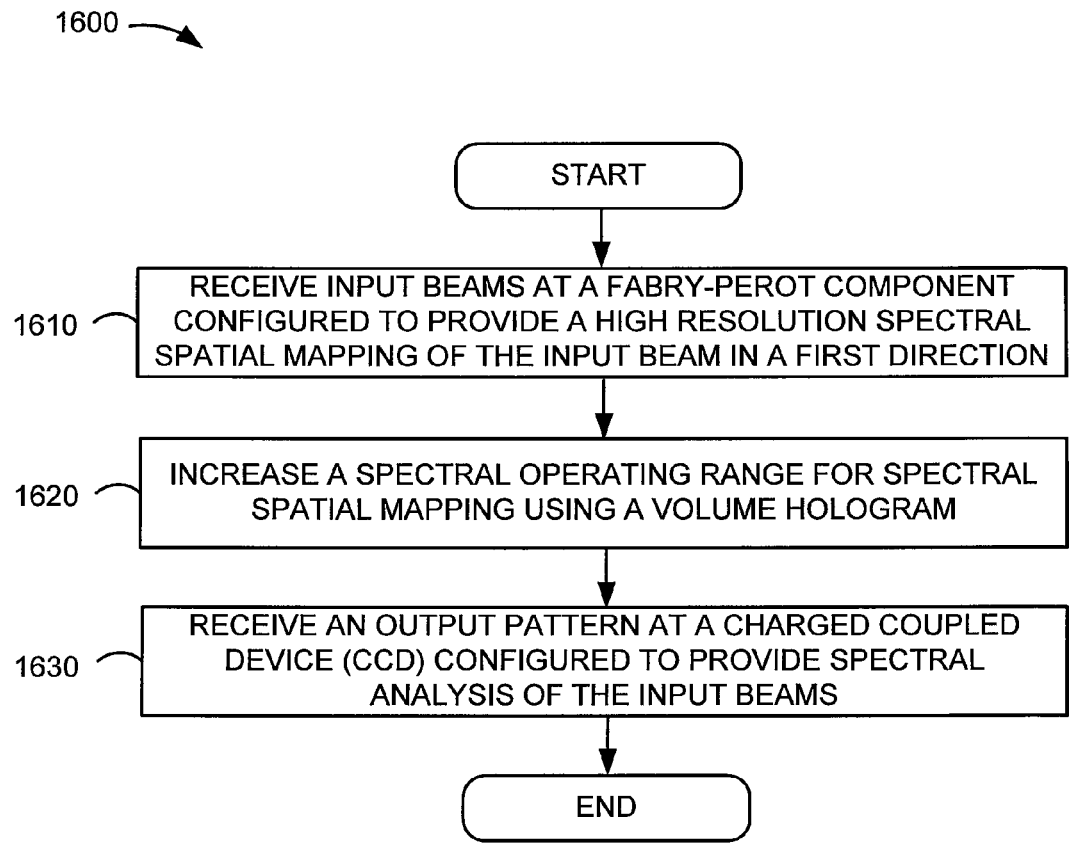
FIG. 16 is a flowchart for an embodiment of a method for performing spectral analysis using the tandem spectrometer in FIG. 15A.

Reference is now made to FIG. 16, which is a flowchart for an embodiment of a method for performing spectral analysis using the tandem spectrometer in FIG. 15A. Beginning with step 1610, input beams are received at a Fabry-Perot component configured to provide a high resolution spectral-spatial mapping of the input beam in a first direction. Next, in step 1620, the spectral operating range is increased by using a volume hologram. The volume hologram is configured to perform spectral mapping in a second direction orthogonal to the first direction. In step 1630, an output pattern is received at the CCD configured to provide spectral analysis of the input beams.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

The invention claimed is:

1. A spectrometer for performing two-dimensional (2D) high resolution spectral-spatial mapping comprising:
    a Fabry-Perot etalon configured to receive a diffuse input beam and provide a high resolution spectral mapping of the diffuse input beam in a first direction;
    a volume hologram for increasing a spectral operating range, the volume hologram configured to perform spectral mapping in a second direction orthogonal to the first direction to increase the spectral operating range; and
    a charged coupled device (CCD) configured to receive output beams, the output beams being used to provide spectral analysis of the input beams.

2. The spectrometer of claim 1, further comprising a first cylindrical lens configured to receive beams from the volume hologram and Fourier transform the received beams in the first direction, the first cylindrical lens having a first focal length; and
    a second cylindrical lens configured to receive the beams from the first cylindrical lens and Fourier transform the beams in the second direction to generate the output beams, the second cylindrical lens having a second focal length.

3. The spectrometer of claim 1, the spectrometer further comprising a spherical lens.

4. The spectrometer of claim 1, wherein the volume hologram is a cylindrical beam volume hologram (CBVH).

5. The spectrometer of claim 1, wherein the volume hologram is a spherical beam volume hologram (SBVH).

6. The spectrometer of claim 1, wherein a free spectral range (FSR) of the Fabry-Perot etalon is equal to a resolution of the volume hologram.

7. The spectrometer of claim 1, wherein the spectral-spatial mapping provided by the Fabry-Perot etalon comprises a circularly symmetric spatial-spectral pattern at the CCD.

8. The spectrometer of claim 7, wherein the Fabry-Perot etalon is configured to encode the high resolution spectral pattern in a y-direction and the CBVH is configured to expand the spectral operating range in an x-direction.

9. The spectrometer of claim 8, wherein a resolution of the Fabry-Perot etalon defines a resolution of the spectrometer.

10. The spectrometer of claim 1, wherein the CBVH is partitioned into a plurality of segments spanning the y-direction.

11. The spectrometer of claim 10, wherein a plurality of holograms are multiplexed into each of the plurality of segments to provide spectral coding, the spectral coding providing an additional order of spectral-spatial mapping.

12. The spectrometer of claim 11, wherein multiplexing the plurality of holograms is performed using angular multiplexing.

13. A spectrometer for performing two-dimensional (2D) high resolution spatial-spectral mapping comprising:
    a volume hologram for increasing a spectral operating range, the volume hologram configured to perform spectral mapping in a second direction orthogonal to a first direction to increase a spectral operating range, the CBVH comprising:
    an integrated Fabry-Perot etalon configured to receive a diffuse input beam and provide a high resolution spectral mapping of the diffuse input beam in the first direction; and
    a cylindrical lens; and
    a charged coupled device (CCD) configured to receive the outputs beams, the output beams being used to provide spectral analysis of the input beams.

14. The spectrometer of claim 13, wherein a free spectral range (FSR) of the Fabry-Perot etalon is equal to resolution of the volume hologram.

15. The spectrometer of claim 13, further comprising a second cylindrical lens.

16. The spectrometer of claim 15, wherein the two cylindrical lenses are integrated into the volume hologram.

17. A method for performing two-dimensional (2D) high resolution spectral-spatial spectroscopy comprising:
    receiving input beams at a Fabry-Perot etalon configured to provide a high resolution spectral-spatial mapping of the input beam in a first direction;
    increasing a spectral operating range for spectral-spatial mapping using a volume hologram, the volume hologram configured to perform spectral mapping in a second direction orthogonal to the first direction to increase a spectral operating range; and
    receiving an output pattern at a charged coupled device (CCD) configured to provide spectral analysis of the input beams.

18. The method of claim 17, further comprising:
    receiving beams from the volume hologram at a first cylindrical lens and focusing the received beams in the first direction, the first cylindrical lens having a first focal length; and
    receiving beams from the first cylindrical lens and focusing the beams in the second direction to generate the output pattern, the second cylindrical lens having a second focal length.

19. The method of claim 18, further comprising:
    receiving beams from the volume hologram at a first cylindrical lens and Fourier transforming the received beams in the first direction, the first cylindrical lens having a first focal length; and
    receiving beams from the first cylindrical lens at a second cylindrical lens and Fourier transforming the beams in the second direction to generate the output pattern, the second cylindrical lens having a second focal length.

20. The method of claim 18, wherein the two cylindrical lenses are integrated into the volume hologram.

21. The method of claim 17, wherein a free spectral range (FSR) of the Fabry-Perot etalon is equal to a resolution of the CBVH.

22. The method of claim 17, wherein the volume hologram is a cylindrical beam volume hologram (CBVH).

23. The method of claim 17, further comprising receiving beams at a spherical lens to generate the output pattern.

24. The method of claim 17, wherein the volume hologram is a spherical beam volume hologram (SBVH).

25. An apparatus for performing two-dimensional (2D) high resolution spectral-spatial mapping comprising:

means for receiving a diffuse input beam and providing a high resolution spectral mapping of the diffuse input beam in a first direction;

means for increasing a spectral operating range by performing spectral mapping in a second direction orthogonal to the first direction;

means for receiving beams at a first cylindrical lens and performing a Fourier transform on the received beams in the first direction;

means for performing a Fourier transform on the beams in the second direction to generate an output pattern; and means for receiving the output pattern, the output pattern used to provide spectral analysis of the input beams.

26. The apparatus of claim 25, wherein a free spectral range (FSR) of a Fabry-Perot etalon is equal to a resolution of the means for increasing the spectral operating range.

* * * * *

UNITED STATES PATENT AND TRADEMARK OFFICE
CERTIFICATE OF CORRECTION

PATENT NO. : 8,203,716 B2  
APPLICATION NO. : 12/447992  
DATED : June 19, 2012  
INVENTOR(S) : Badleirostami et al.

Page 1 of 3

It is certified that error appears in the above-identified patent and that said Letters Patent is hereby corrected as shown below:

In the Specification

Column 2, lines 36-37: replace "out-puts beams" with -- out-put beams --

In the Claims

Column 15, line 40, Claim 1: replace "output beams, the output beams" with -- an output beam, the output beams --

Column 15, line 41, Claim 1: replace "the input beams" with -- the diffuse input beam --

Column 15, line 47, Claim 2: replace "receive the beams" with -- receive a beam --

Column 15, line 49, Claim 2: replace "beams in the second direction" with -- beam from the first cylindrical lens in the second direction --

Column 15, line 61, Claim 7: replace "The spectrometer of claim 1" with -- The spectrometer of claim 4 --

Column 15, line 61, Claim 7: replace "the spectral spatial-mapping" with -- the high resolution spectral-spatial mapping" --

Column 16, line 3, Claim 10: replace "The spectrometer of claim 1" with -- The spectrometer of claim 4 --

Column 16, line 9, Claim 11: replace "spectral-spatial mapping" with -- high resolution spectral-spatial mapping --

Signed and Sealed this  
Eighteenth Day of February, 2014

Michelle K. Lee  
*Deputy Director of the United States Patent and Trademark Office*

CERTIFICATE OF CORRECTION (continued)

U.S. Pat. No. 8,203,716 B2

Column 16, lines 16-17, Claim 13: replace "perform spectral mapping" with -- perform high resolution spectral-spatial mapping --

Column 16, line 19, Claim 13: replace "CBVH" with -- volume hologram --

Column 16, lines 21-22, Claim 13: replace "high resolution spectral mapping" with -- high resolution spectral-spatial mapping --

Column 16, lines 25-26, Claim 13: replace "receive the outputs beams, the output beams" with -- receive an output beam, the output beam --

Column 16, line 29, Claim 14: replace "equal to resolution" with -- equal to a resolution --

Column 16, line 33, Claim 16: replace "wherein the two" with -- wherein the first and second --

Column 16, line 37, Claim 17: replace "receiving input beams" with -- receiving an input beam --

Column 16, line 40, Claim 17: replace "range for spectral-spatial" with -- range for high resolution spectral-spatial --

Column 16, line 42, Claim 17: replace "perform spectral mapping" with -- perform high resolution spectral-spatial mapping --

Column 16, line 47, Claim 17: replace "input beams" with -- input beam --

Column 16, line 49, Claim 18: replace "receiving beams" with -- receiving a beam --

Column 16, line 50, Claim 18: replace "received beams" with -- received beam from the volume hologram --

Column 16, line 53, Claim 18: replace "receiving beams" with -- receiving a beam --

Column 16, line 54, Claim 18: replace "the beams in" with -- the beam from the first cylindrical lens --

Column 16, line 58, Claim 19: replace "receiving beams" with -- receiving a beam --

Column 16, line 59, Claim 19: replace "the received beams" with -- the beam received from the volume hologram --

Column 16, line 63, Claim 19: replace "transforming the beams" with -- transforming the beams received from the first cylindrical lens --

Column 16, line 66, Claim 20: replace "wherein the two" with -- wherein the first and second --

CERTIFICATE OF CORRECTION (continued)
U.S. Pat. No. 8,203,716 B2

Column 17, line 3, Claim 21: replace "CBVH" with -- "volume hologram" --

Column 17, line 13, Claim 25: replace "high resolution spectral mapping" with -- high resolution spectral-spatial mapping --

Column 18, lines 1-2, Claim 25: replace "per-forming spectral mapping" with -- forming high resolution spectral-spatial mapping --

Column 18, line 7, Claim 25: replace "on the beams" with -- on the received beams --

Column 18, line 10, Claim 25: replace "the input beams" with -- the diffuse input beam --